United States Patent
Sato

(10) Patent No.: US 10,456,923 B2
(45) Date of Patent: Oct. 29, 2019

(54) SENSOR AND ROBOT

(71) Applicant: CANON KABUSHIKI KAISHA, Tokyo (JP)

(72) Inventor: Shuuichi Sato, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/876,505

(22) Filed: Jan. 22, 2018

(65) Prior Publication Data

US 2018/0215047 A1 Aug. 2, 2018

(30) Foreign Application Priority Data

Jan. 27, 2017 (JP) .................... 2017-013672

(51) Int. Cl.
*G01D 5/00* (2006.01)
*B25J 13/08* (2006.01)
*G01D 5/26* (2006.01)
*G01D 5/14* (2006.01)
*G01L 3/14* (2006.01)

(52) U.S. Cl.
CPC ............ *B25J 13/085* (2013.01); *G01D 5/145* (2013.01); *G01D 5/26* (2013.01); *G01L 3/1435* (2013.01); *Y10S 901/15* (2013.01); *Y10S 901/46* (2013.01)

(58) Field of Classification Search
CPC ......... B25J 13/085; G01D 5/145; G01D 5/26; G01L 3/1435; Y10S 901/15; Y10S 901/46
USPC ..................................................... 73/862.325
See application file for complete search history.

(56) References Cited

U.S. PATENT DOCUMENTS

| 7,537,388 | B2 * | 5/2009 | Koike | G01D 5/145 324/207.2 |
| 8,365,615 | B2 | 2/2013 | Sato et al. | |
| 9,563,601 | B2 | 2/2017 | Sato | |
| 2006/0095171 | A1 * | 5/2006 | Whittaker | G05D 1/027 701/25 |
| 2006/0247868 | A1 * | 11/2006 | Brandstrom | G01N 27/82 702/35 |
| 2013/0292557 | A1 * | 11/2013 | Nakamura | G01D 5/34776 250/231.1 |
| 2014/0039519 | A1 * | 2/2014 | Inoue | A61B 34/37 606/130 |
| 2016/0221193 | A1 | 8/2016 | Sato | |
| 2017/0100840 | A1 | 4/2017 | Sato | |
| 2017/0366053 | A1 * | 12/2017 | Ash | H02K 1/148 |

(Continued)

OTHER PUBLICATIONS

T. Kawakami, et al., "Development of Rigid Torque Sensor with Linear Encoder for Joint Torque Control", The University of Tokyo, Dept. of Mechano-Informatics, Mar. 16, 2009. (with English Abstract).

*Primary Examiner* — Max H Noori
*Assistant Examiner* — Masoud H Noori
(74) *Attorney, Agent, or Firm* — Venable LLP

(57) ABSTRACT

A sensor includes a first support portion, a second support portion, an incremental encoder, a magnetic-flux generating source, and a magnetoelectric transducer. The incremental encoder includes a scale supported by the first support portion and a head supported by the second support portion. The magnetic-flux generating source is supported by one of the first support portion and the second support portion. The magnetoelectric transducer is supported by another of the first support portion and the second support portion.

13 Claims, 10 Drawing Sheets

(56) References Cited

U.S. PATENT DOCUMENTS

2018/0099421 A1* 4/2018 Ogata .................... B25J 13/085
2018/0333858 A1* 11/2018 Asano .................... B25J 9/1694

* cited by examiner

SENSOR AND ROBOT

BACKGROUND OF THE INVENTION

Field of the Invention

The present invention relates to a sensor and a robot including the sensor.

Description of the Related Art

A robot that operates in accordance with a robot program is used for producing a product. A control method of controlling the operation of the robot by providing the robot with a torque sensor and measuring torque applied to a joint is used for producing a product that requires an assembly operation. Regarding a torque sensor of this kind, a torque sensor with a high rigidity and a high resolution can be realized by using an incremental encoder that is capable of measuring microscopic displacement with low noise. In the case of using an incremental encoder, a relative amount of displacement is measured by setting initial positions of a scale and a head as a starting point. Therefore, the amount of displacement is sometimes lost due to a cause such as an object hitting the robot. To address this, a torque sensor provided with two encoders including an incremental encoder and an absolute encoder configured to measure an absolute amount of displacement is proposed in Tomohiro KAWAKAMI, Ko AYUSAWA, Hiroshi KAMINAGA, Kosuke KUROSAKI, Christian OTT, and Yoshihiko NAKAMURA: "Development of Rigid Torque Sensor with Linear Encoder for Joint Torque Control", 14th Robotics Symposia Proceedings p. 120-125 (2009). In Tomohiro KAWAKAMI, Ko AYUSAWA, Hiroshi KAMINAGA, Kosuke KUROSAKI, Christian OTT, and Yoshihiko NAKAMURA: "Development of Rigid Torque Sensor with Linear Encoder for Joint Torque Control", a value of the incremental encoder is appropriately compensated by using the absolute encoder.

However, in the case of using two encoders, that is, an incremental encoder and an absolute encoder, a scale and a head of each encoder need to be disposed so as to oppose each other without any obstacle therebetween. Therefore, there has been a problem that the size of the sensor increases due to restrictions of placement of the encoders.

SUMMARY OF THE INVENTION

According to one aspect of the present invention, a sensor includes a first support portion and a second support portion disposed to oppose each other and configured to be relatively displaceable with respect to each other, an incremental encoder comprising a scale supported by the first support portion and a head supported by the second support portion, a magnetic-flux generating source supported by one of the first support portion and the second support portion, and a magnetoelectric transducer supported by another of the first support portion and the second support portion.

Further features of the present invention will become apparent from the following description of exemplary embodiments with reference to the attached drawings.

DESCRIPTION OF THE EMBODIMENTS

Exemplary embodiments of the present invention will be described below in detail with reference to drawings.

First Exemplary Embodiment

Figure 1:
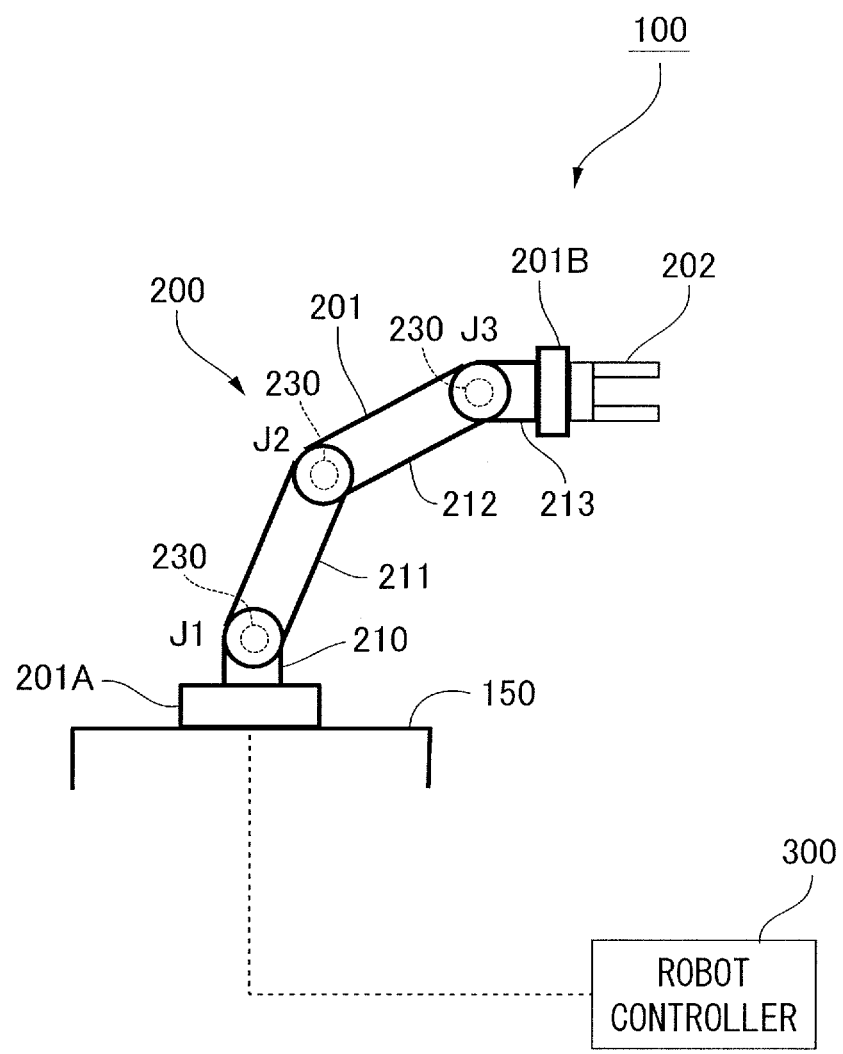
FIG. 1 is an explanatory diagram illustrating a robot system according to a first exemplary embodiment.

FIG. 1 is an explanatory diagram illustrating a robot system according to a first exemplary embodiment. As illustrated in FIG. 1, a robot system 100 includes a robot 200 and a robot controller 300. The robot 200 is used for producing a product. For example, the robot 200 is used for mounting a first workpiece on a second workpiece. The robot 200 includes a robot arm 201 and a robot hand 202. The robot hand 202 is an example of an end effector. The robot arm 201 is a vertically articulated robot arm. A fixed end 201A serving as a proximal end of the robot arm 201 is fixed to a stand 150. The robot hand 202 is attached to a free end 201B serving as a distal end of the robot arm 201. The robot arm 201 includes a plurality of links 210, 211, 212, and 213, and these links 210, 211, 212, and 213 are rotatably interconnected by joints J1, J2, and J3. Each of the joints J1 to J3 of the robot arm 201 is provided with a drive unit 230. A drive unit of an appropriate output is used as the drive unit 230 of each of the joints J1 to J3 in accordance with needed strength of torque. Hereinafter, with regard to the robot arm 201, description will be representatively given on the joint J1, and description of the other joints J2 and J3 will be omitted because the joints J2 and J3 have configurations that are, although may be different in size or performance, similar to the configuration of the joint J1.

Figure 2:
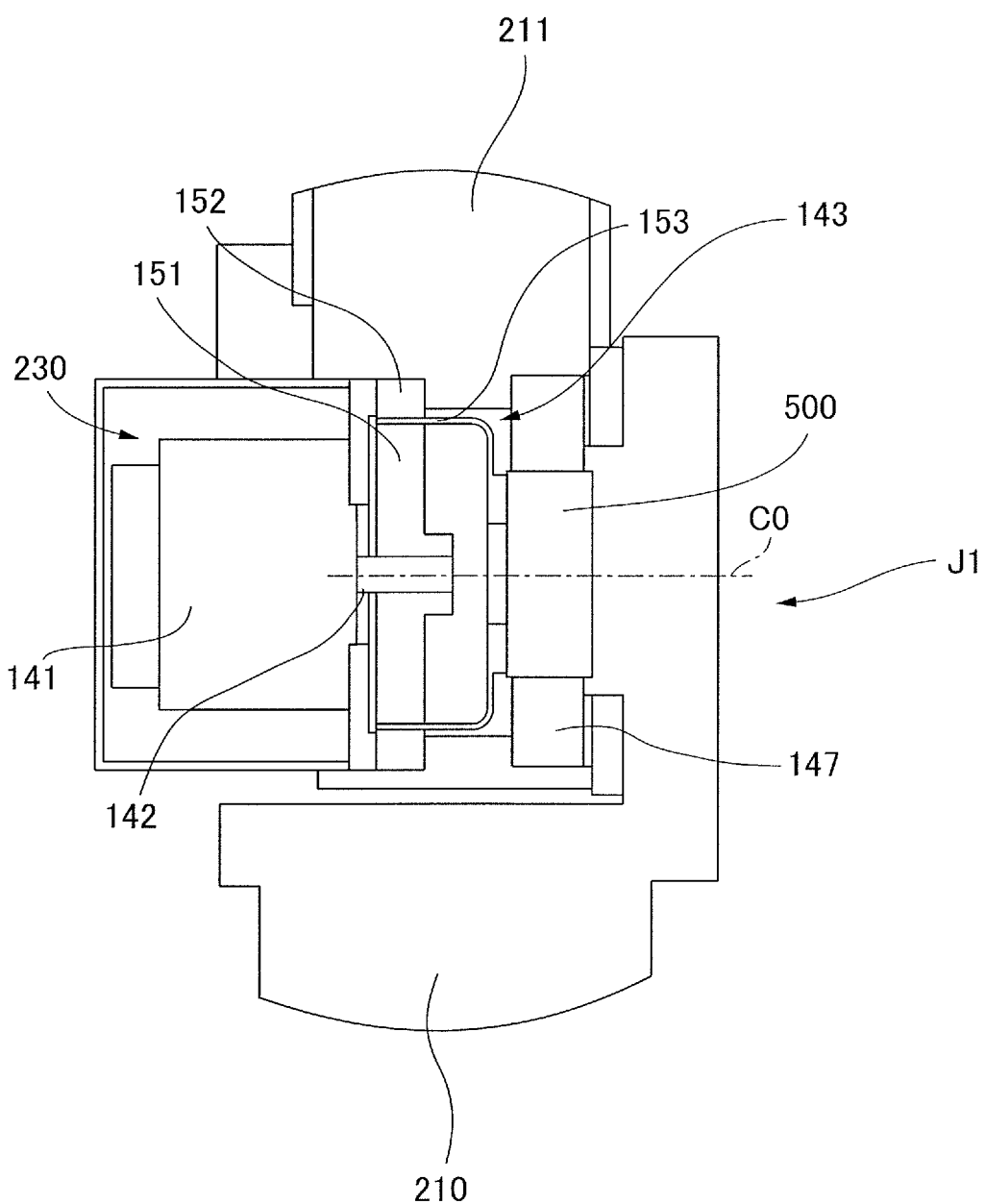
FIG. 2 is a partial section view of a joint of a robot arm according to the first exemplary embodiment.

FIG. 2 is a partial section view of the joint J1 of the robot arm 201 according to the first exemplary embodiment. The drive unit 230 includes an electric motor 141, a reduction gear 143, and a torque sensor 500. The motor 141 serves as a drive source. The reduction gear 143 is coupled to a rotation shaft portion 142 of the motor 141, and outputs a decelerated rotation of the rotation shaft portion 142. The torque sensor 500 is an example of a sensor. The rotation shaft portion 142 of the motor 141 rotates about a rotation axis C0. The links 210 and 211 are rotatably interconnected via a cross roller bearing 147. The motor 141 is a servomotor, and examples thereof include a brushless direct current servomotor and an alternate current servomotor. The reduction gear 143 is, for example, a wave gear reducer. The reduction gear 143 includes a web generator 151 and a circular spline 152. The web generator 151 is coupled to the rotation shaft portion 142 of the motor 141, and the circular spline 152 is fixed to the link 211. Although the circular spline 152 is coupled to the link 211, the circular spline 152 may be formed integrally with the link 211. In addition, the reduction gear 143 includes a flexspline 153 disposed between the web generator 151 and the circular spline 152 and coupled to the link 210 via the torque sensor 500. The flexspline 153 is decelerated at a predetermined reduction ratio with respect to the rotation of the web generator 151, and relatively rotates with respect to the circular spline 152. Therefore, the link 211 to which the circular spline 152 is coupled relatively rotates about the rotation axis C0 with respect to the link 210 to which the flexspline 153 is coupled via the torque sensor 500. The torque sensor 500 is disposed between the link 210 and an output axis of the reduction gear 143, that is, between the link 210 serving as a first link and the link 211 serving as a second link. The torque sensor 500 measures torque around the rotation axis C0 applied between the links 210 and 211, and outputs an electric signal corresponding to a torque value serving as a measured value to the robot controller 300.

Figure 3:
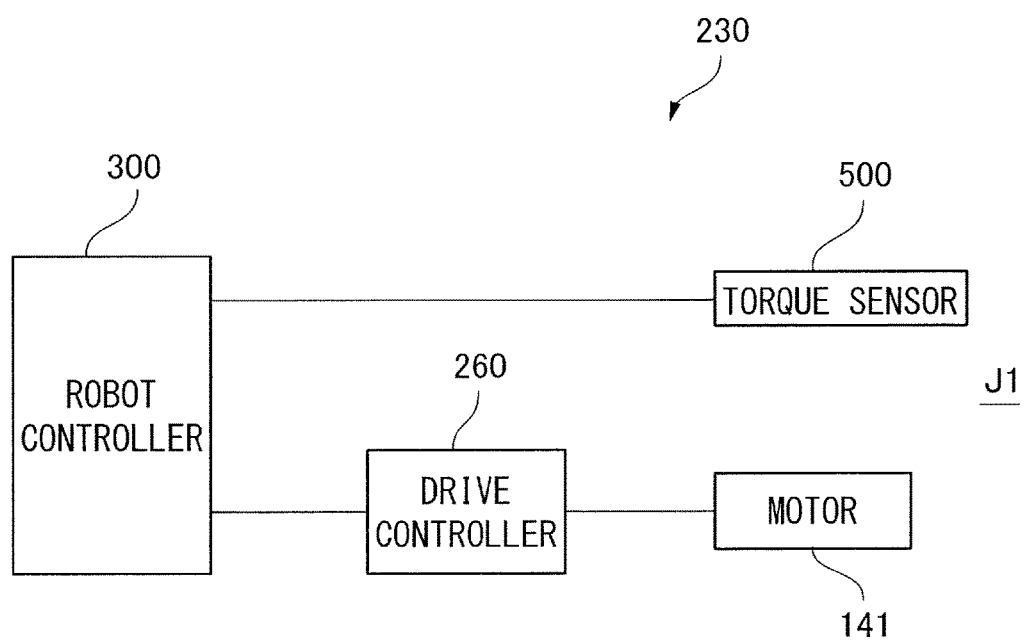
FIG. 3 is a block diagram illustrating a control system of the joint of the robot arm according to the first exemplary embodiment.

FIG. 3 is a block diagram illustrating a control system of the joint J1 of the robot arm 201 according to the first exemplary embodiment. The drive unit 230 includes a drive controller 260 electrically connected to the motor 141 and the robot controller 300. The torque sensor 500 of the drive unit 230 is electrically connected to the robot controller 300.

The robot controller 300 performs overall control of the entirety of the robot system 100. That is, the robot controller 300 controls the operation of the robot 200. The control of the operation of the robot 200 includes position control and force control. When performing position control, the robot controller 300 generates an operation instruction on the basis of the position of the fingertip of the robot 200, and outputs the generated operation instruction to the drive controller 260. When performing force control, the robot controller 300 generates an operation instruction on the basis of the torque value that is a measured value obtained by the torque sensor 500, and outputs the generated operation instruction to the drive controller 260. The drive controller 260 controls energization of the motor 141 in accordance with the operation instruction to drive the motor 141. When performing force control, the robot 200 is operated on the basis of the output from the torque sensor 500, and thus the performance of force control of the robot 200 depends on the precision, that is, resolution, of the torque sensor 500.

Figure 4A:
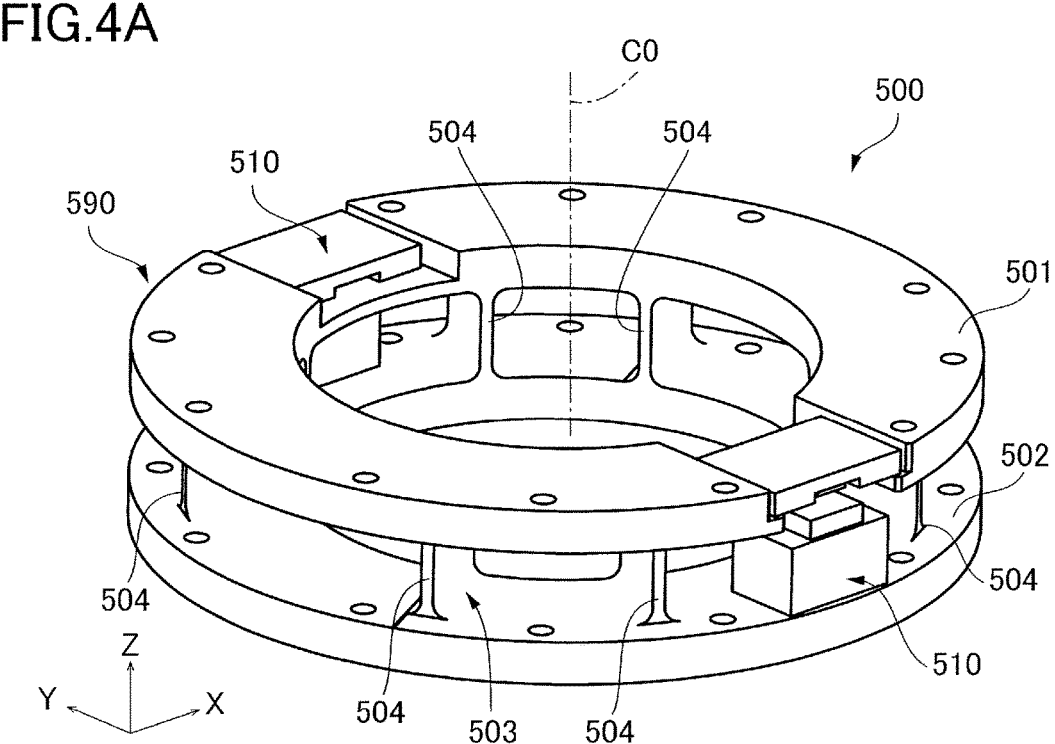
FIG. 4A is a perspective view of a torque sensor according to the first exemplary embodiment.
Figure 4B:
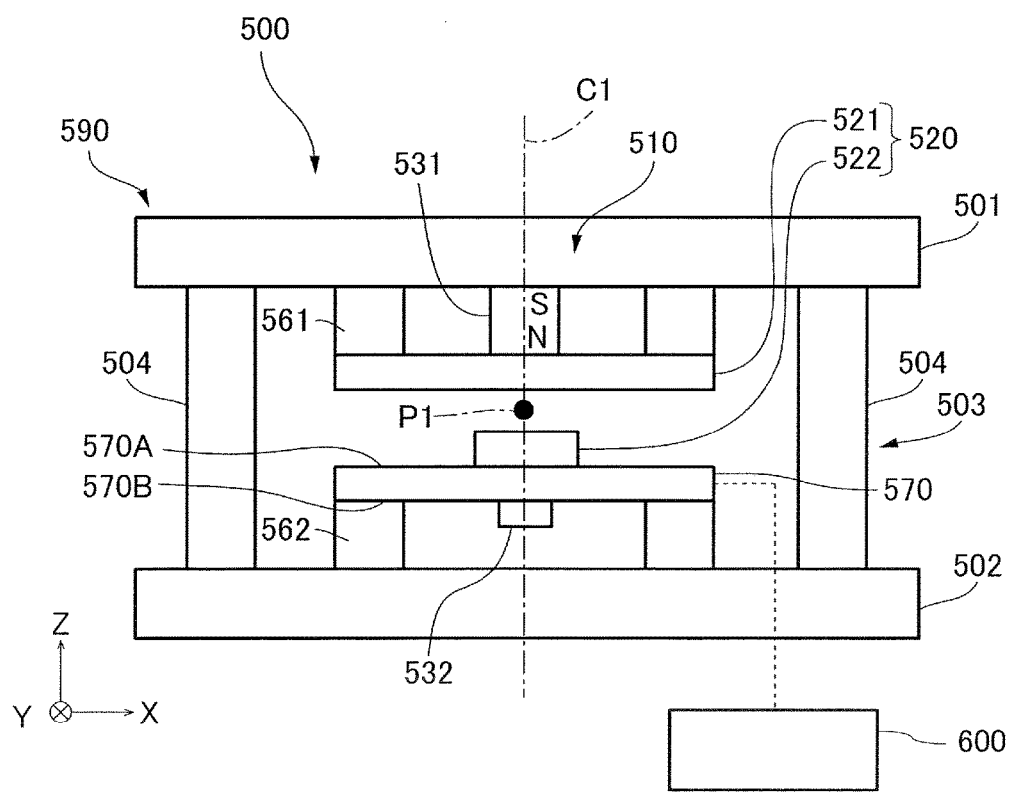
FIG. 4B is a schematic diagram illustrating a portion of the torque sensor according to the first exemplary embodiment.

FIG. 4A is a perspective view of the torque sensor 500 according to the first exemplary embodiment. FIG. 4B is a schematic diagram illustrating a portion of the torque sensor 500 according to the first exemplary embodiment. The torque sensor 500 includes a sensor body 590 and a calculation unit 600 serving as a calculation portion. The sensor body 590 includes support portions 501 and 502. The support portion 501 is fastened to one of the reduction gear 143 and the link 210 illustrated in FIG. 2, and serves as a first support portion. The support portion 502 is fastened to the other of the reduction gear 143 and the link 210 illustrated in FIG. 2, and serves as a second support portion.

The support portions 501 and 502 are flat plate members having, for example, ring-like shapes centered on the rotation axis C0 as illustrated in FIG. 4A, and are relatively displaceable with respect to each other in a rotation direction about the rotation axis C0. To be noted, the shapes of the support portions 501 and 502 are not limited to these, and may be, for example, disk-like shapes. The support portions 501 and 502 constitute flange portions that are respectively capable of being fastened to the link 210 and the reduction gear 143 via bolts or the like. The support portions 501 and 502 are disposed at positions opposing each other with an interval in a Z direction in which the rotation axis C0 extends, and are coupled to each other via an elastic member 503.

The elastic member 503 includes a plurality of leaf springs 504 arranged radially around the rotation axis C0 with intervals between one another. When torque is applied between the links 210 and 211 illustrated in FIG. 2, the support portions 501 and 502 are relatively and rotationally displaced about the rotation axis C0 by a rotation amount corresponding to the strength of the applied torque. The leaf springs 504 of the elastic member 503 are each formed of a material having an elastic coefficient, that is, a spring coefficient, corresponding to a target range of measurement of torque, a required resolution, and so forth. For example, the material of the elastic member 503 is resin or metal. Examples of the metal include steel and stainless steel. In the first exemplary embodiment, the support portions 501 and 502 and the elastic member 503 are formed of the same material.

The sensor body 590 includes sensor portions 510 used for measuring relative displacement between the support portions 501 and 502, that is, torque applied between the support portions 501 and 502. In the first exemplary embodiment, the sensor body 590 includes two sensor portions 510 having the same configuration, and the two sensor portions 510 are disposed at positions in rotational symmetry of 180° about the rotation axis C0. To be noted, the number of sensor portions 510 is not limited to two, and may be one, three, or more.

The sensor portions 510 each include an encoder 520, a magnetic-flux generating source 531, and a magnetoelectric transducer 532. The encoder 520 is an incremental encoder. In addition, the encoder 520 is preferably not a magnetic encoder, and examples thereof include optical encoders and encoders of an electrostatic capacitance type. Among these, optical encoders are more preferable. Therefore, in the first exemplary embodiment, the encoder 520 is an optical encoder. The relative displacement between the support portions 501 and 502 about the rotation axis C0 is minute at the position of the sensor portion 510, and can be regarded as displacement in an X direction that is a translational direction. Therefore, the encoder 520 is a linear encoder in the first exemplary embodiment.

The encoder 520 includes a scale 521 and a head 522. The scale 521 is supported by the support portion 501, and the head 522 is supported by the support portion 502. The magnetic-flux generating source 531 is supported by one of the support portions 501 and 502, and the magnetoelectric transducer 532 is supported by the other of the support portions 501 and 502. In the first exemplary embodiment, the magnetic-flux generating source 531 is supported by the support portion 501, and the magnetoelectric transducer 532 is supported by the support portion 502. The relative displacement between the support portions 501 and 502 can be measured as a relative amount from a certain standard position by using the encoder 520. In addition, the relative displacement between the support portions 501 and 502 can be measured as a magnetic flux, that is, an absolute amount, by using the magnetic-flux generating source 531 and the magnetoelectric transducer 532.

The calculation unit 600 obtains an absolute amount of relative displacement between the support portions 501 and 502 on the basis of a signal from the head 522 of the encoder 520 and a signal from the magnetoelectric transducer 532. That is, the calculation unit 600 compensates a relative amount of measured displacement indicated by the signal from the head 522 of the encoder 520 by using an absolute amount of measured displacement indicated by the signal from the magnetoelectric transducer 532, and thus obtains the absolute amount of relative displacement between the support portions 501 and 502. Then, the calculation unit 600 converts the amount of displacement into a torque value, and outputs the torque value to the robot controller 300.

The magnetic flux generated by the magnetic-flux generating source 531 is distributed in a wide range in a space in which the magnetoelectric transducer 532 is disposed. Therefore, using the magnetic-flux generating source 531 and the magnetoelectric transducer 532 reduces the limitation of arrangement of the magnetic-flux generating source 531 and the magnetoelectric transducer 532 compared with the case of using an absolute encoder, and thus miniaturization of the torque sensor 500 can be realized. In addition, the precision of measurement of the amount of relative displacement between the support portions 501 and 502, that is, the precision of measurement of torque between the support portions 501 and 502 can be improved.

Figure 5A:
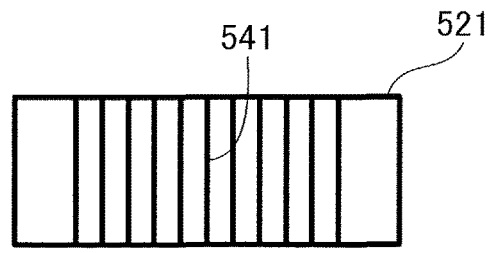
FIG. 5A is a plan view of a scale.
Figure 5B:
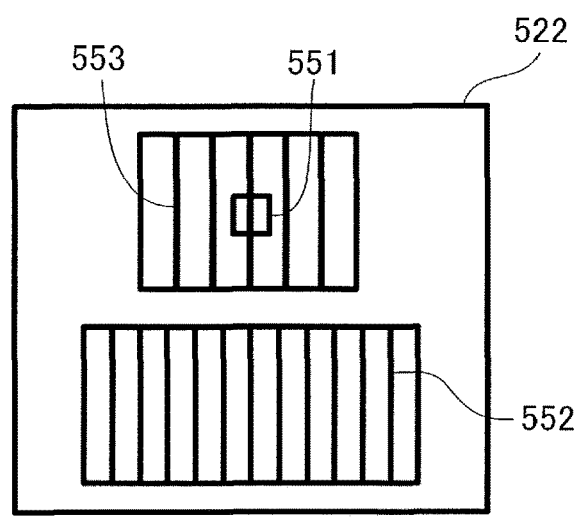
FIG. 5B is a plan view of a head.
Figure 5C:
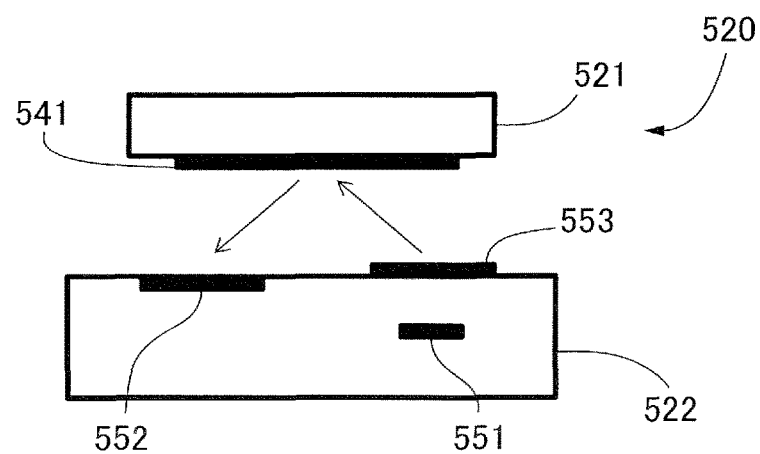
FIG. 5C is a section view of the scale and the head.

The scale 521 and the head 522 that optically measures the displacement and the magnetic-flux generating source 531 and the magnetoelectric transducer 532 that magnetically measures the displacement will be described in detail. FIG. 5A is a plan view of the scale 521, FIG. 5B is a plan view of the head 522, and the FIG. 5C is a section view of the encoder 520, that is, the scale 521 and the head 522.

The scale 521 is a scale of, for example, a light reflection type, and includes a lattice-like optical pattern 541 as illustrated in FIG. 5A. The optical pattern 541 is formed from, for example, Al and Cr. The head 522 is a head of, for example, a light reflection type, and includes a light emitting element 551 and a light receiving element array 552 as illustrated in FIG. 5B. An index lattice pattern 553 is disposed above the light emitting element 551. Although detailed illustration is omitted, the light receiving element array 552 of the head 522 includes sub-arrays disposed in, for example, a plurality of phases in a staggered arrangement. An example of the plurality of phases is two phases A and B. A displacement signal can be obtained by processing respective signals of the two phases A and B obtained from these sub-arrays of the light receiving element array 552.

A measurement range determined from the maximum external force applied to the torque sensor 500 and an amount of displacement of the elastic member 503 in which the external force is generated can be freely set by arbitrarily changing the length of the scale 521. The pitch of the optical pattern 541 of the scale 521 is determined in accordance with the resolution or the like required for the measurement of displacement. As the precision and resolution of the encoder 520 has increased, it has become possible to use an optical pattern having a pitch of the order of micrometers. Considering the influence of the magnetic-flux generating source 531 and the magnetoelectric transducer 532 on the measurement, it is desirable that the scale 521 and the head 522 are each formed of a nonmagnetic material.

The magnetic-flux generating source 531 may be a permanent magnet such as a Nd—Fe—B magnet, a Sm—Co magnet, a Sm—Co magnet, a Sm—Fe—N magnet, or a ferrite magnet, or an electromagnet that generates magnetic force as a result of winding a coil around a magnetic body and supplying a current thereto. The magnetic-flux generating source 531 is preferably a permanent magnet that does not require supply of a current. Examples of the magnetoelectric transducer 532 include a Hall element, a magnetoresistive element, a magneto-impedance element, a flux-gate element, and a wound coil. In the first exemplary embodiment, the north pole or the south pole, that is, a magnetic pole of the magnetic-flux generating source 531 opposes the magnetoelectric transducer 532. That is, the north pole-south pole direction of the magnetic-flux generating source 531 is the Z direction. To be noted, the direction of the magnetic-flux generating source 531 is not limited to this. The magnetic-flux generating source 531 may be disposed in any direction as long as the magnetic flux in the magnetoelectric transducer 532 changes when the magnetoelectric transducer 532 is displaced in the X direction. For example, the magnetic-flux generating source 531 may be disposed such that the north pole-south pole direction of the magnetic-flux generating source 531 is the X direction that intersects with the Z direction.

The scale 521, the head 522, the magnetic-flux generating source 531, and the magnetoelectric transducer 532 are disposed between the support portions 501 and 502. As a result of this, the scale 521 and the head 522 can be disposed close to each other, the magnetic-flux generating source 531 and the magnetoelectric transducer 532 can be disposed close to each other, and thus the size of the torque sensor 500 can be further reduced.

The scale 521, the head 522, the magnetic-flux generating source 531, and the magnetoelectric transducer 532 are arranged in the Z direction in which the support portions 501 and 502 oppose each other. By arranging the scale 521, the head 522, the magnetic-flux generating source 531, and the magnetoelectric transducer 532 in series in the Z direction, the relative displacement of the head 522 with respect to the scale 521 and the relative displacement of the magnetoelectric transducer 532 with respect to the magnetic-flux generating source 531 become approximately equal. That is, although relative displacement sometimes occurs between the support portions 501 and 502 in the case where force is applied in a direction different from the X direction in which the torque is measured, for example, the Y direction or Z direction, or in the case where thermal drift occurs, such displacement occurs between the scale 521 and the head 522 and between the magnetic-flux generating source 531 and the magnetoelectric transducer 532 in similar degrees. Since the difference between the optically measured displacement and the magnetically measured displacement can be reduced, the precision of measurement of the amount of relative displacement, that is, torque, between the support portions 501 and 502 can be improved.

Since the encoder 520 is an optical encoder in the first exemplary embodiment, the scale 521 and the head 522 are disposed to oppose each other such that there is no object that shields light therebetween. In addition, the magnetic-flux generating source 531 and the magnetoelectric transducer 532 are disposed at such positions that the scale 521 and the head 522 are interposed therebetween and the center of the scale 521 and the head 522 coincides with the center of the magnetic-flux generating source 531 and the magnetoelectric transducer 532 at a point P1. As a result of this, the magnetic-flux generating source 531 and the magnetoelectric transducer 532 do not block the optical path of the encoder 520, and the encoder 520 does not block the magnetic flux. That is, the encoder 520 and the magnetic-flux generating source 531 and the magnetoelectric transducer 532 do not interfere with each other. Further, this is a preferable configuration because the scale 521 and the head 522 can be disposed close to each other.

In the first exemplary embodiment, the head 522 and the magnetoelectric transducer 532 are fixed to a substrate 570. The substrate 570 is a printed wiring board mainly constituted by resin and copper foil or gold foil, and constitutes a part of wiring connecting the calculation unit 600 to the head 522 and the magnetoelectric transducer 532. Therefore, the wiring of the head 522 and the magnetoelectric transducer 532 can be drawn from the support portion 502 side, and thus the wiring structure can be simplified. To be noted, although a case where the head 522 and the magnetoelectric transducer 532 are fixed to the single substrate 570 has been described, each of the head 522 and the magnetoelectric transducer 532 may be provided with a different substrate.

The head 522 is fixed to one surface 570A of the substrate 570, and the magnetoelectric transducer 532 is fixed to the other surface 570B of the substrate 570. In addition, the substrate 570 is fixed to the support portion 502 via a fixing member 562 such that the surface 570A faces the support portion 501 and the surface 570B faces the support portion 502. The scale 521 is fixed to the support portion 501 via a fixing member 561, and the magnetic-flux generating source 531 is disposed and fixed between the scale 521 and the support portion 501.

According to the above configuration, when torque is applied around the axis C0 between the pair of support portions 501 and 502 of the torque sensor 500, the elastic member 503 is deformed around the axis C0. The support portions 501 and 502 are relatively displaced from each other in the X direction in accordance with the deformation of the elastic member 503, and the torque is measured by measuring the displacement by the sensor portions 510 and converting the displacement into a torque value.

Figure 6A:
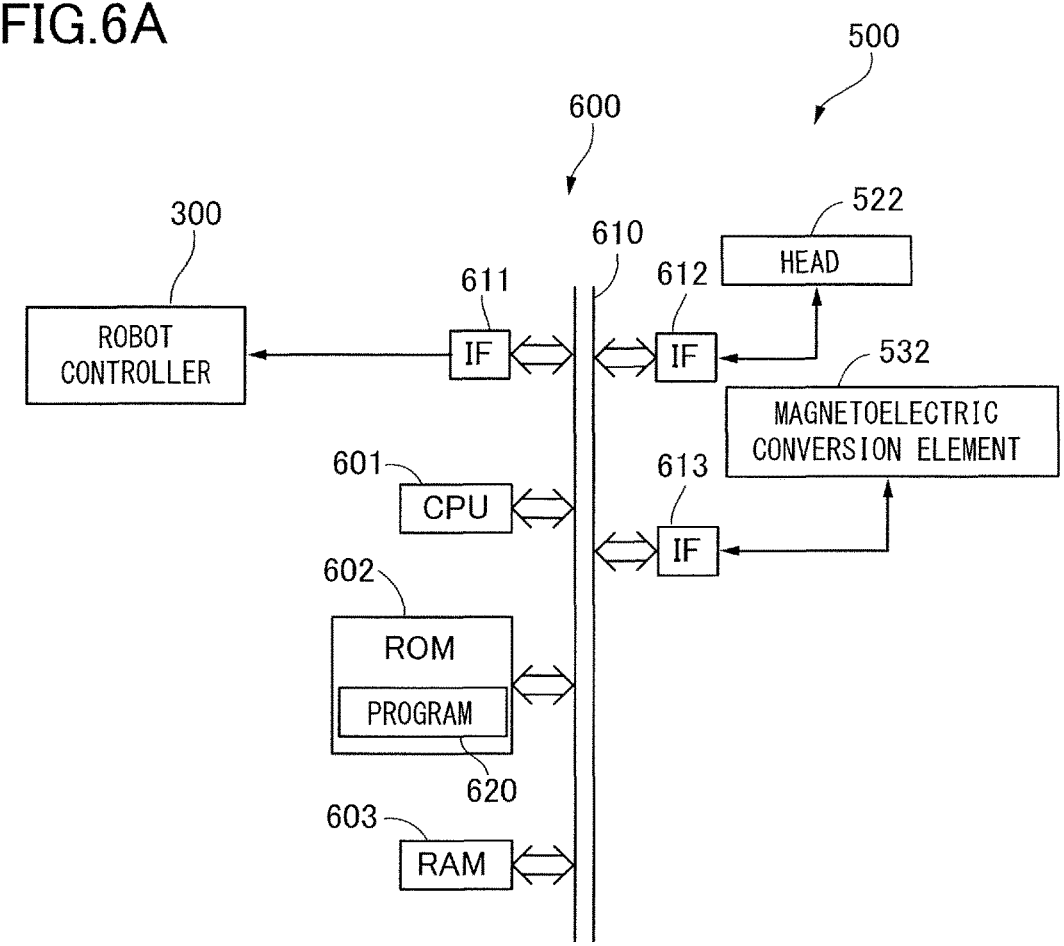
FIG. 6A is a block diagram illustrating a control system of the torque sensor according to the first exemplary embodiment.

FIG. 6A is a block diagram illustrating a control system of the torque sensor 500 according to the first exemplary embodiment. The calculation unit 600 of the torque sensor 500 is constituted by a microcomputer or the like. The calculation unit 600 includes a central processing unit: CPU 601. In addition, the calculation unit 600 includes a read only memory: ROM 602 and a random access memory: RAM 603 as storage portions. Further, the calculation unit 600 includes a plurality of interfaces 611 to 613 and a bus 610. The CPU 601, the ROM 602, the RAM 603, and the interfaces 611 to 613 are communicably interconnected via the bus 610.

The CPU 601 performs arithmetic processing for obtaining an amount of displacement, that is, a torque value. The ROM 602 is a storage unit that stores a program 620 for causing the CPU 601 to execute the arithmetic processing, that is, a recording medium in which the program 620 is recorded. The RAM 603 is a storage unit that temporarily stores various data such as results of arithmetic processing by the CPU 601.

The interface 611 is connected to the robot controller 300, and a signal indicating a torque value is transmitted to the robot controller 300 via the interface 611. The interface 612 is connected to the head 522. The interface 612 flickers the light emitting element 551 of the head 522, and transmits a signal from the light receiving element array 552 to the CPU 601. The interface 613 is connected to the magnetoelectric transducer 532. When the magnetic-flux generating source 531 and the magnetoelectric transducer 532 disposed to oppose each other are relatively displaced from each other, change in the density of magnetic flux passing through the magnetoelectric transducer 532 caused by the displacement appears in voltage. The interface 613 includes an amplifier that amplifies the output voltage of the magnetoelectric transducer 532, changes the gain of the signal from the magnetoelectric transducer 532, and transmits the signal to the CPU 601.

Figure 6B:
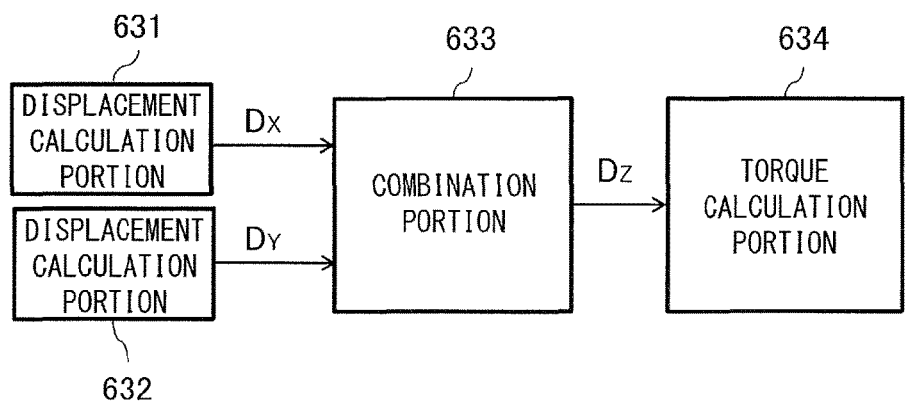
FIG. 6B is a functional block diagram of a calculation unit.

FIG. 6B is a functional block diagram of the calculation unit 600. The CPU 601 illustrated in FIG. 6A executes the program 620, and thus functions as displacement calculation portions 631 and 632, a combination portion 633, and a torque calculation portion 634. Functions of the portions 631 to 634 will be described in detail below.

Figure 7A:
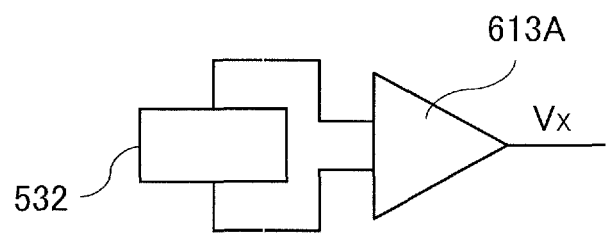
FIG. 7A is a schematic diagram illustrating a circuit for measuring an output of a magnetoelectric transducer.
Figure 7B:
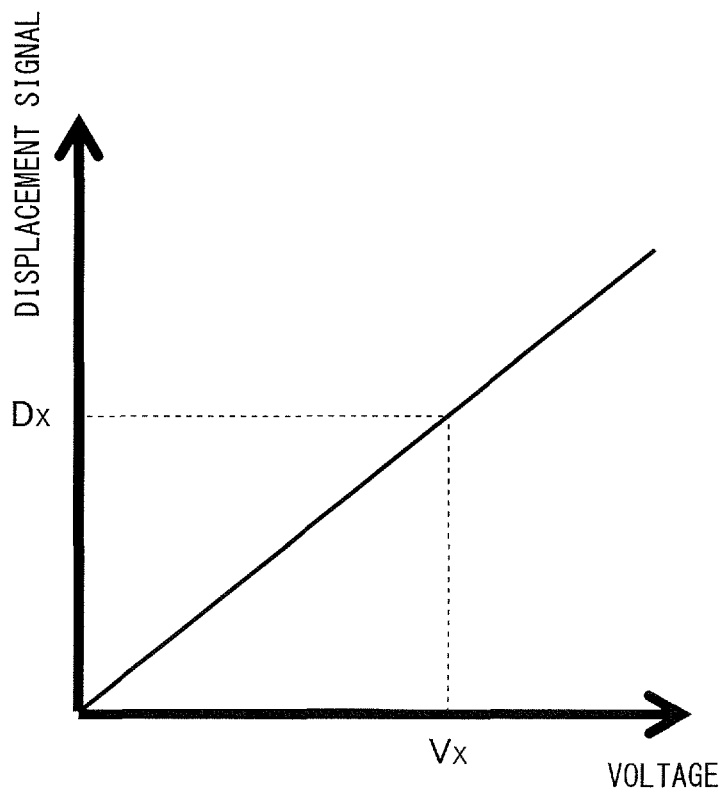
FIG. 7B is a diagram for describing arithmetic processing in the calculation unit.

FIG. 7A is a schematic diagram illustrating a circuit for measuring the output of the magnetoelectric transducer 532. FIG. 7B is a diagram for described arithmetic processing performed by the calculation unit 600. The magnetoelectric transducer 532 outputs a voltage corresponding to a displaced position of the magnetoelectric transducer 532 with respect to the magnetic-flux generating source 531, that is, a measured magnetic flux. Then, as illustrated in FIG. 7A, the amplifier 613A of the interface 613 amplifies the output voltage of the magnetoelectric transducer 532, and outputs a voltage $V_X$ proportional to the measured magnetic flux. The displacement calculation portion 631 illustrated in FIG. 6B generates a displacement signal $D_X$ corresponding to the voltage $V_X$ that has been input thereto. In the first exemplary embodiment, the displacement calculation portion 631 generates the displacement signal $D_X$ corresponding to the voltage $V_X$ obtained from the magnetoelectric transducer 532 on the basis of a relationship stored in advance in the ROM 602 serving as a storage portion. In FIG. 7B, the voltage $V_X$ and the displacement signal $D_X$ are in a proportional relationship in a measurement range D.

Figure 8A:
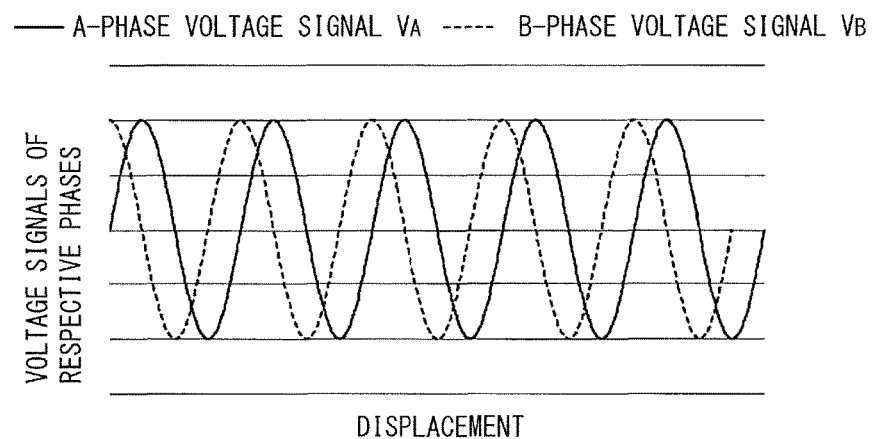
FIG. 8A is a diagram for describing a voltage signal output by a head of an encoder.

FIG. 8A is a diagram for describing voltage signals output from the head 522 of the encoder 520. The head 522 outputs an A-phase voltage signal $V_A$ and a B-phase voltage signal $V_B$ as results of measurement. The voltage signals $V_A$ and $V_B$ are voltage signals of sine waves of different phases. The displacement calculation portion 632 obtains a measured value $D_Y$ that is a relative displacement signal by calculating $\tan^{-1}(V_A/V_B)$ from the voltage signals $V_A$ and $V_B$ that have been input thereto.

Figure 8B:
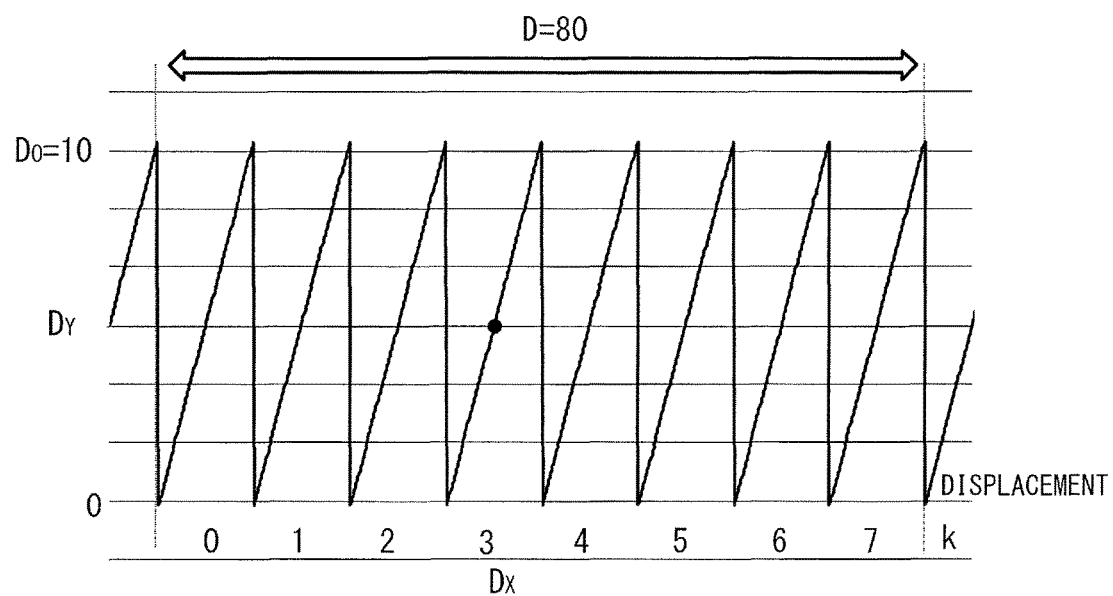
FIG. 8B is a diagram for describing processing of obtaining the amount of relative displacement between a pair of support portions.

FIG. 8B is a diagram for describing a process for obtaining an amount of relative displacement $D_Z$ between the support portions 501 and 502. FIG. 8B illustrates values of $\tan^{-1}(V_A/V_B)$, that is, the waveform of the measured value $D_Y$. When the displacement of the head 522 with respect to the scale 521 increases and decreases, the value of $\tan^{-1}(V_A/V_B)$, that is, the measured value $D_Y$, changes periodically in a sawtooth waveform. Therefore, the measured value $D_Y$ takes a periodic value in accordance with the relative displacement between the scale 521 and the head 522, that is, the relative displacement between the support portions 501 and 502, in the measurement range D. That is, although the encoder 520 can measure microscopic displacement, since the measured value $D_Y$ periodically and repetitively takes the same value, the displacement between the scale 521 and the head 522 cannot be obtained as an absolute amount by using only the measured value D. Therefore, it is difficult to specify, by using only the measured value $D_Y$, to which cycle the measured value $D_Y$ corresponds in the case where drastic displacement occurs in a short time exceeding one cycle of the sawtooth wave as a result of, for example, something hitting the robot 200.

The combination portion 633 obtains the number of waves k of the sawtooth wave, that is, a cycle number of the measured value $D_Y$ indicating the cycle to which the measured value $D_Y$ corresponds, by using the displacement signal $D_X$ as illustrated in FIG. 8B. Specifically, correspondence between the displacement signal $D_X$ and the number of waves k is stored in the ROM 602 serving as a storage portion in advance, and the combination portion 633 obtains the number of waves k of the sawtooth wave on the basis of the correspondence stored in the ROM 602. Next, the combination portion 633 obtains the amount of relative displacement $D_Z$ between the support portions 501 and 502 by adding the measured value $D_Y$ to the product of an increment value $D_O$ of one cycle of the sawtooth wave and the number of waves k. That is, the combination portion 633 calculates $D_A = D_O \times k + D_Y$. For example, in the case where the value $D_O$ is 10 and a measurement range D is 80, the number of waves k is an integer from 0 to 7. In addition, for example, in the case where the number of waves k obtained from the displacement signal $D_X$ is 3 and the measured value $D_Y$ is 5, the amount of displacement $D_Z$ is determined as 35(=10× 3+5). As described above, the combination portion 633 determines the amount of displacement $D_Z$ from the measured value $D_Y$ and the number of waves k.

In the first exemplary embodiment, as a result of using an optical incremental encoder as the encoder 520, the relative amount of displacement of the head 522 with respect to the scale 521, that is, the measured value $D_Y$ can be measured at a high resolution. In addition, by compensating the measured value $D_Y$ with an absolute amount of displacement obtained by the magnetic-flux generating source 531 and the magnetoelectric transducer 532, the amount of relative displacement $D_Z$ between the support portions 501 and 502 can be obtained with a high precision and at a high resolution. That is, by interpolating the measurement result of microscopic displacement obtained by the displacement calculation portion 632 into the measurement result of absolute displacement obtained by the displacement calculation portion 631, the amount of microscopic displacement between the scale 521 and the head 522 can be obtained as an absolute amount. Accordingly, by combining the output of absolute displacement in a wide range with the output of highly-resolved microscopic displacement in a minute range, the absolute displacement between the support portions 501 and 502 can be measured with a high precision and at a high resolution.

The torque calculation portion 634 illustrated in FIG. 6B obtains the torque applied between the support portions 501 and 502 on the basis of the amount of displacement $D_Z$. Specifically, the torque calculation portion 634 obtains the torque by multiplying a conversion coefficient determined from the elasticity of the elastic member 503 by the amount of displacement $D_Z$. This conversion coefficient is stored in the ROM 602 serving as a storage portion, and the torque calculation portion 634 obtains the torque by using the conversion coefficient stored in the ROM 602. As described above, according to the first exemplary embodiment, the torque can be measured with a high precision and at a high resolution. The measured torque value is transmitted to the robot controller 300, and used for force control of the robot 200. The torque sensor 500 can stably measure the torque with a high precision even in the case where force is applied suddenly to a joint of the robot 200 as a result of, for example, an object hitting the robot 200. Therefore, stable force control of the robot 200 can be realized.

Second Exemplary Embodiment

Figure 9:
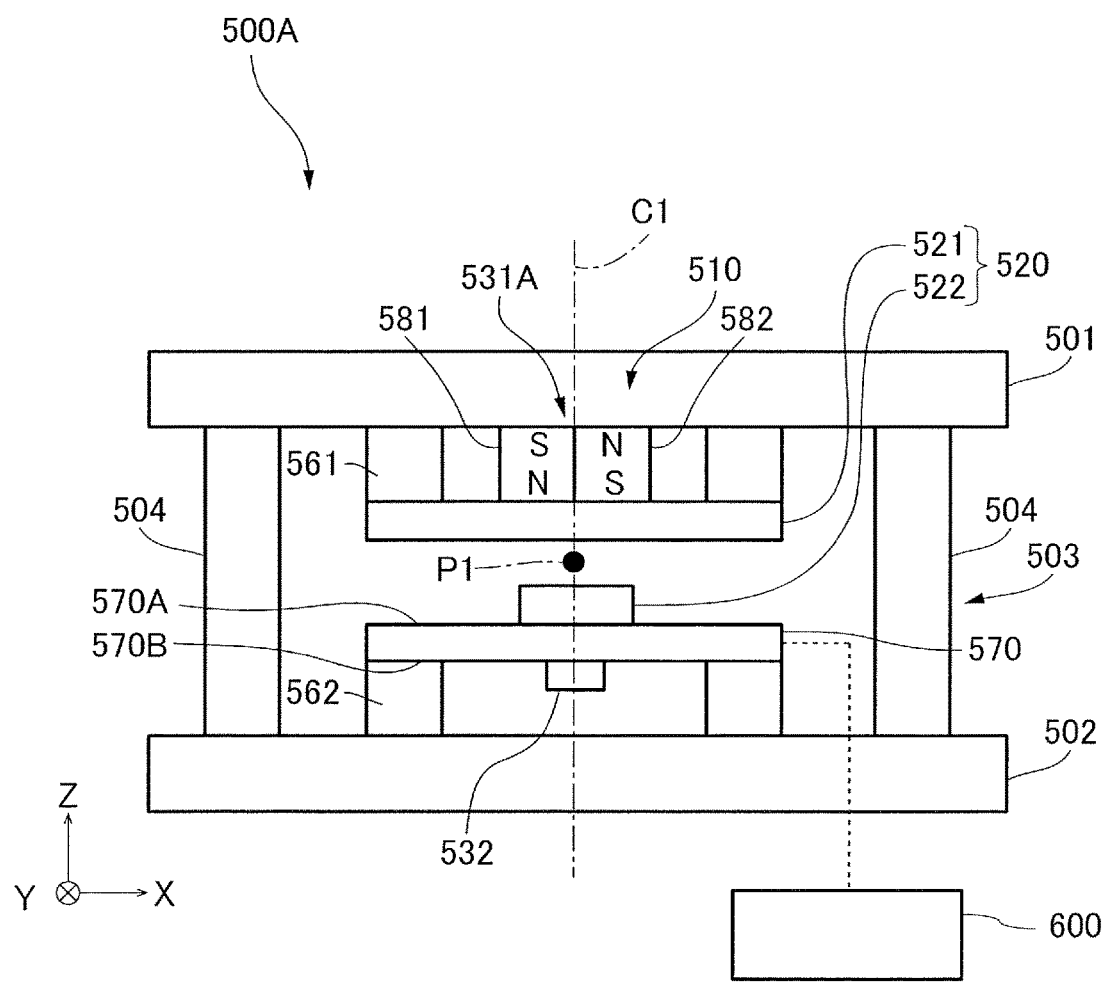
FIG. 9 is a schematic diagram illustrating a portion of a torque sensor according to a second exemplary embodiment.

Next, a torque sensor according to a second exemplary embodiment of the present invention will be described. FIG. 9 is a schematic diagram illustrating a portion of a torque sensor 500A according to the second exemplary embodiment. In the second exemplary embodiment, the configuration of a magnetic-flux generating source 531A of the torque sensor 500A is different from the configuration of the magnetic-flux generating source 531 of the torque sensor 500 described in the first exemplary embodiment.

The magnetic-flux generating source 531A includes a plurality of magnets, that is, a magnet 581 serving as a first magnet and a magnet 582 serving as a second magnet. The magnets 581 and 582 are preferably permanent magnets. The magnets 581 and 582 have the same rectangular parallelepiped shape of the same size. The magnets 581 and 582 are disposed adjacent to each other. In addition, the magnets 581 and 582 are disposed such that the magnetic poles thereof are opposite to each other. That is, the magnets 581 and 582 adjacent to each other are disposed such that the direction of the magnetic field is inverted at the boundary therebetween. Specifically, the north pole of the magnet 581 is adjacent to the south pole of the magnet 582, and the south pole of the magnet 581 is adjacent to the north pole of the magnet 582. Further, the magnetic-flux generating source 531A is disposed such that the magnetic poles of the magnets 581 and 582 oppose the magnetoelectric transducer 532.

Figure 10A:
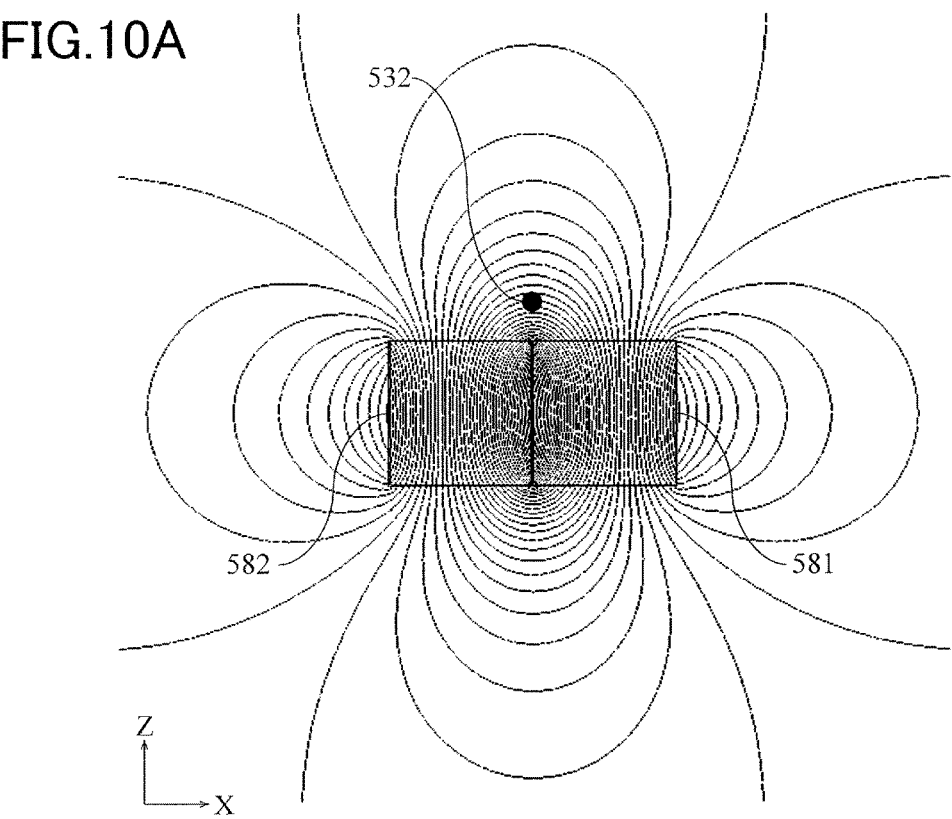
FIG. 10A is a plan view of a magnetic field illustrating results of simulation of the second exemplary embodiment.

FIG. 10A is a plan view of the magnetic field illustrating results of simulation performed on the magnetic-flux generating source 531A of the second exemplary embodiment by using a two-dimensional static magnetic field model. FIG. 10A illustrates lines of magnetic force. The simulation illustrated in FIG. 10A was performed by using a computer assuming that two magnets 581 and 582 each having a size of 5 mm in the Z direction and 5 mm in the X direction were disposed in an air atmosphere, and that the magnets 581 and 582 adjacent to each other had opposite polarities in the Z direction. Further, the simulation was performed by setting properties of a Nd—Fe—B magnet having a remanence of about 1.4 T and a coercivity of about 100 kA/m as properties of the magnets 581 and 582. In the simulation, it was assumed that the magnetoelectric transducer 532 was disposed in a position 1 mm away from the magnetic pole plane of the magnets 581 and 582 and opposing the boundary between the magnets 581 and 582 adjacent to each other, and in such a direction as to measure a Z-direction component of the magnetic field.

Figure 10B:
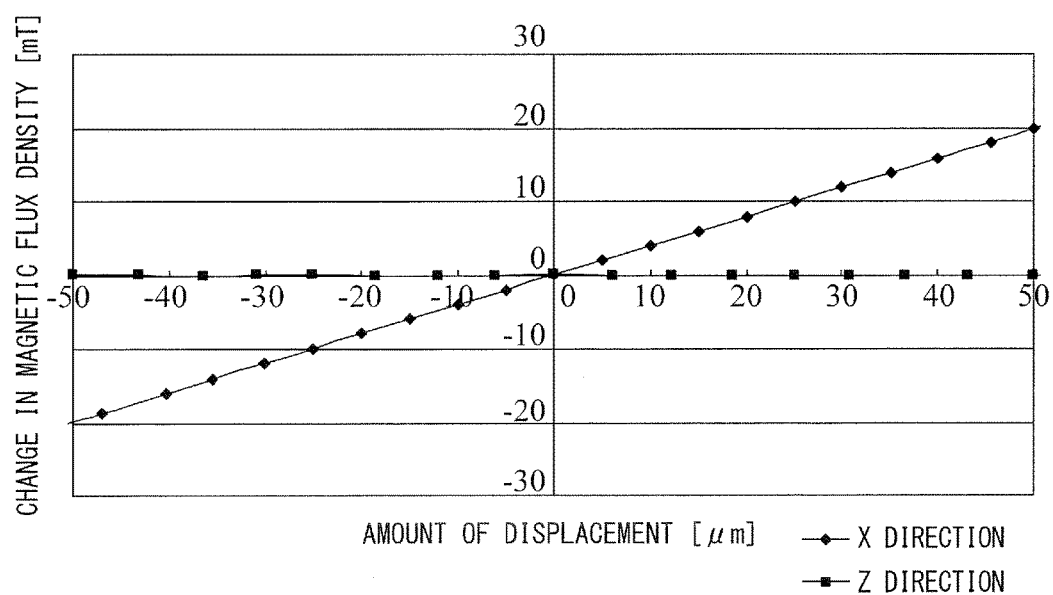
FIG. 10B is a graph illustrating results of simulation.

FIG. 10B is a graph illustrating changes in the density of magnetic flux passing through the magnetoelectric transducer 532 in the case of displacing the magnetoelectric transducer 532 in the Z direction different from the X direction in which the torque is measured and in the case of displacing the magnetoelectric transducer 532 in the X direction. The magnetoelectric transducer 532 was displaced by ±50 μm respectively in the X direction and in the Z direction. As illustrated in FIG. 10B, in the magnetoelectric transducer 532, there is a large change in the magnetic flux density of the Z-direction component of the magnetic field with respect to the displacement in the X direction in which the torque is measured. In contrast, the change in the magnetic flux density of the Z-direction component of the magnetic field with respect to the displacement in the Z direction in which the torque is not measured is small. Accordingly, by employing the configuration of the magnetic-flux generating source 531A described above, the output generated by the displacement in the direction in which the torque is not measured can be made small with respect to the output generated by the displacement in the direction in which the torque is measured. As a result of this, the torque can be measured with an even higher precision.

To be noted, the present invention is not limited to the exemplary embodiments described above, and can be modified in various ways within the technical concept of the present invention. In addition, the effects described in the exemplary embodiments are merely most preferable effects that can be possibly achieved by the present invention, and the effects of the present invention are not limited to the effects described in the exemplary embodiments.

Although a case where the robot arm 201 is a vertically articulated robot arm has been described in the above exemplary embodiments, the structure of the robot arm 201 is not limited to this. For example, a horizontally articulated robot arm, a parallel link robot arm, a cartesian coordinate robot, or the like may be used.

In addition, although a case where the magnetic-flux generating source 531 or 531A is supported by the support portion 501 and the magnetoelectric transducer 532 is supported by the support portion 502 has been described in the above exemplary embodiments, the arrangement may be reversed. That is, the magnetoelectric transducer 532 may be supported by the support portion 501, and the magnetic-flux generating source 531 or 531A may be supported by the support portion 502.

In addition, although a case where the sensor is a torque sensor has been described in the above exemplary embodiments, the sensor is not limited to this. For example, the sensor may be a force sensor.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-013672, filed Jan. 27, 2017, which is hereby incorporated by reference wherein in its entirety.

What is claimed is:

1. A sensor comprising:
   first and second support portions configured to be relatively displaceable with respect to each other;
   a first displacement measuring unit configured to measure displacement between the first support portion and the second support portion and is an incremental type; and
   a second displacement measuring unit configured to measure displacement between the first support portion and the second support portion and is not the incremental type,
   wherein the second displacement measuring unit comprises:
   a magnetic-flux generating source supported by one of the first support portion and the second support portion; and
   a magnetoelectric transducer supported by another of the first support portion and the second support portion,
   wherein the first displacement measuring unit comprises:
   a scale supported by one of the first support portion and the second support portion; and
   a head supported by another of the first support portion and the second support portion, and
   wherein the scale, the head, the magnetoelectric transducer, and the magnetic-flux generating source are disposed such that the scale and the head oppose each other and are interposed between the magnetoelectric transducer and the magnetic-flux generating source.

2. The sensor according to claim 1, wherein the scale, the head, the magnetoelectric transducer, and the magnetic-flux generating source are disposed between the first support portion and the second support portion.

3. The sensor according to claim 1, wherein the scale, the head, the magnetoelectric transducer, and the magnetic-flux generating source are arranged in a direction in which the first support portion and the second support portion oppose each other.

4. The sensor according to claim 1, further comprising a substrate to which the head and the magnetoelectric transducer are fixed,
   wherein the substrate is fixed to the second support portion.

5. The sensor according to claim 4, wherein the head is fixed to one surface of the substrate and the magnetoelectric transducer is fixed to another surface of the substrate.

6. The sensor according to claim 1, wherein the first support portion and the second support portion are interconnected by an elastic member.

7. The sensor according to claim 1, wherein the magnetic-flux generating source comprises a first magnet and a second magnet disposed such that a magnetic pole of the second magnet is opposite to a magnetic pole of the first magnet.

8. The sensor according to claim 1, wherein the first displacement measuring unit is an optical encoder.

9. The sensor according to claim 1, further comprising a calculation portion configured to obtain an amount of relative displacement between the first support portion and the second support portion on a basis of a signal from the head and a signal from the magnetoelectric transducer.

10. The sensor according to claim 9,
wherein the calculation portion is configured to obtain a measured value, a cycle number, and the amount of relative displacement,
wherein the measured value is obtained on a basis of the signal from the head and changes periodically in accordance with displacement of the head with respect to the scale,
wherein the cycle number is obtained on a basis of the signal from the magnetoelectric transducer and indicates a cycle of the measured value corresponding to the displacement, and
wherein the amount of relative displacement is obtained on a basis of the measured value and the cycle number.

11. The sensor according to claim 9, wherein the calculation portion is configured to obtain a torque between the first support portion and the second support portion on a basis of the amount of relative displacement.

12. A robot comprising:
a robot arm; and
the sensor according to claim 1, provided at a joint of the robot arm.

13. A method for manufacturing products using the robot according to claim 12,
the method comprising:
operating the robot to measure displacement by the first displacement measuring unit and to measure the displacement by the second displacement measuring unit; and
performing an operation to a workpiece by operating the robot.

* * * * *